No. 776,706. Patented December 6, 1904.

UNITED STATES PATENT OFFICE.

HEINRICH WACHWITZ, OF HERSBRUCK, NEAR NUREMBERG, GERMANY, ASSIGNOR TO THE WACHWITZ PATENTS SYNDICATE LIMITED, OF LONDON, ENGLAND.

METAL-WELDING.

SPECIFICATION forming part of Letters Patent No. 776,706, dated December 6, 1904.

Application filed September 10, 1902. Serial No. 122,796. (No specimens.)

*To all whom it may concern:*

Be it known that I, HEINRICH WACHWITZ, a subject of the King of Bavaria, and a resident of Hersbruck, near Nuremberg, Bavaria, Germany, have invented certain new and useful Improvements in Metal-Welding; and I do hereby declare the following to be a full, clear, and exact description of the invention, such as will enable others skilled in the art to which it appertains to make and use the same.

This invention relates to the welding of metals, and has for its object to effect the production of aluminium-bronze and the coating or plating of iron, steel, copper, or other metal the melting-point of which is above 700° with this alloy.

The metal—for example, copper—is first welded to the aluminium in the manner described in the specification of the patent granted to Heinrich Wachwitz and his assignees, No. 684,479, dated October 15, 1901, and application for patent, dated October 28, 1901, Serial No. 80,236. During this process no appreciable alloyage between the copper and aluminium takes place, and the compound sheet or body can be treated by rolling or otherwise and shaped into any desired form.

According to the present invention the sheets or bodies (or the objects formed from them) are subjected to a temperature at which further alloyage occurs. Thus according to the relative proportions or thickness of the aluminium and copper sheets there is formed a body of aluminium-bronze, or the copper is provided with a coating or plating of this alloy.

The qualities of the alloy can be varied by regulating the relative proportions of the copper and aluminium sheets.

In applying a coating of aluminium-bronze to iron or steel, for example, in the form of plates a copper sheet is first plated on both sides with aluminium in the manner described in the patent specifications above referred to. The surface of the iron is cleansed, and the compound sheet is applied to this surface, and both sheets are heated together in a suitable furnace. The temperature to which the sheets are raised is such that the iron or steel will not oxidize. While in this state the sheets are subjected to rolling or pressing, after which the compound sheets will be found to adhere closely to the iron, so as to prevent oxidation of the latter even when heated to a much higher temperature. The iron sheet, with its plating or coating of compound copper and aluminium, is, after it has been shaped or brought to the required form, subjected to a welding temperature—for example, about 950° centigrade—with the result that the copper and aluminium layers combine to form an aluminium-bronze coating upon the iron backing. The whole is now passed through rollers at this heat, so that complete welding takes place between the layer of aluminium-bronze and the iron or steel.

According to another method, in place of the copper sheet being plated with aluminium on both sides, as above described, it is covered on only one side with aluminium. This compound sheet is applied to the iron in the manner previously mentioned with the aluminium side next to the iron, two sheets being caused to unite by moderate heating and rolling and then by further heating and rolling, so as to bring about welding. This results in the iron being covered with a plating of copper, with a layer of aluminium-bronze between the copper and the iron. The copper surface is now cleansed and plated with aluminium in the manner described in the prior specifiation above referred to, and the whole is finally rolled and heated to a welding temperature, whereby further alloyage takes place, so that aluminium-bronze is formed from the copper surface downward.

The latter method may be employed when the metal is too hard or brittle to permit rolling. Though in the above description the formation of sheets has been principally dealt with, it is to be understood that wire or other bodies can be dealt with in the same way by utilizing appropriately-shaped rolls or by manipulating the metal in other ways, such as hammering or pressing when rolling is not applicable.

What I claim, and desire to secure by Letters Patent, is—

1. A process of coating a base metal with aluminium-bronze, which consists in placing a copper sheet previously plated with aluminium on the base metal with the aluminium next to the base metal, heating the combined metals to a point below that at which the base metal will oxidize, compressing the combined metals and again heating the same to a welding temperature whereby the aluminium and copper metals combine to form aluminium-bronze, and said bronze adjacent to the base metal is caused to unite therewith.

2. A method for covering a base metal with aluminium-bronze, consisting in placing a copper sheet previously plated on both sides with aluminium on the base metal, heating the combined metals to a point below that at which the base metal will oxidize, compressing the same, and then heating, compressing, and rolling the same again in a welding temperature whereby the aluminium coverings on both sides of the copper are alloyed with the surfaces of the latter, and the inner alloy united with the base metal and holds the copper thereon, the outer alloy representing the desired bronze.

In testimony whereof I affix my signature in presence of two witnesses.

HEINRICH WACHWITZ.

Witnesses:
A. WIELE,
MAX SCHNEIDER.